UNITED STATES PATENT OFFICE 2,441,571

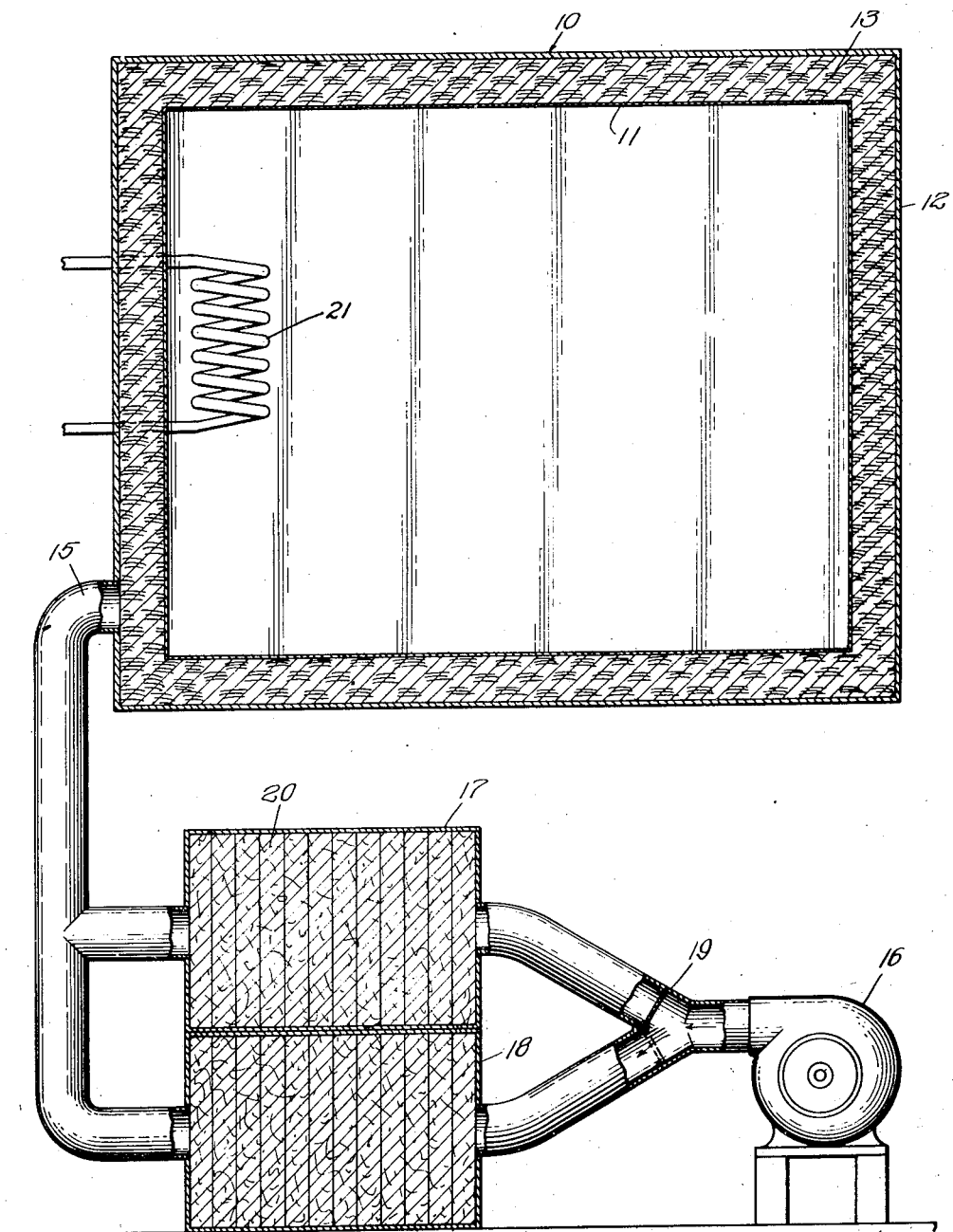

METHOD AND APPARATUS FOR THE PREVENTION OF CONDENSATION

Arnold H. Heineman, Chicago, Ill., assignor to Vacuum Process Corporation, a corporation of Illinois Application April 28, 1945, Serial No. 590,793

5 Claims. (Cl. 62—170)

This invention relates to a refrigerating chamber and more particularly to a double walled chamber having a porous insulator between the walls.

In refrigerating chambers, particularly those intended for extremely low temperatures, such as —70° to—80° F., the problem of condensation of moisture in the insulating material is serious. It is apparently impossible on any large scale chamber to produce complete hermetic sealing between the outer atmosphere and the insulating material, or, for that matter, between the insulating material and the inside of the test chamber. Minor leaks always occur and, as a result, moisture builds up more or less rapidly within the pores of the insulation.

In the present invention this difficulty is eliminated in a very simple manner by maintaining within the insulating material a very slight superatmospheric pressure. This pressure is maintained by supplying a gentle current of air which has been dried below the dew point at the lowest temperature to be encountered within the chamber.

The invention is illustrated in the drawing, in which 10 represents a test chamber of a size sufficient to accommodate airplane motors and the like, and having an inner wall 11 spaced from the outer wall 12. Between the walls is a discontinuous insulating medium 13, preferably cork. The walls 11 and 12 are as near hermetically sealed as is practicable under the circumstances, but there will be pin holes or other leaks in both walls. Dry air is supplied to the insulation space through a line 15 which derives its air by a blower or fan 16. Intermediate the blower and the insulating area are a pair of drying chambers 17 and 18. Air is passed from the fan through one or the other of the chambers, the direction of flow being controlled by the valve 19. Within the chambers 17 and 18 is any suitable dehydrating material 20 which may be activated alumina, silical gel, calcium chloride, or the like. By having a dual system it is possible to regenerate one chamber during the operation of the other.

Suitable doors or other openings to the chamber 10 and the chambers 17 and 18 are of course supplied but have not been illustrated. The interior of the chamber is cooled by any suitable refrigerating means such as the coil 21.

The fan normally supplies air only at a pressure of about one inch of water. The amount of drying provided within the chambers 17 and 18 depends upon the temperatures to be encountered within the refrigerating chamber. Normally the refrigerating chamber for test purposes will have a range from —100° F. to —200° F., and, under these circumstances, a dew point of —80° F. in the air supplied is feasible and will maintain dry conditions. It may of course be made to have a lower dew point. At —80° F. the vapor pressure of ice is 0.006 mm.

A fan is of particular value because it will maintain a constant slight pressure. If there is expansion of air in the insulating space, the excess air will vent through the fan against its static pressure, whereas with a pump it would not do so.

The foregoing detailed description has been given for clearness of understanding only, and no unnecessary limitations should be understood therefrom.

What I claim as new, and desire to secure by Letters Patent, is:

1. In a refrigerating device, a substantially but imperfectly hermetically sealed wall defining a refrigerating chamber, means for cooling the chamber to a refrigerating temperature, a second wall spaced outside of the first wall defining an insulating space between the walls, a porous insulating material in the insulating space, said second wall also being substantially but imperfectly hermetically sealed, and means for supplying dry gas under slight superatmospheric pressure to said insulating space, said gas leaving said insulating space through said imperfections.

2. A device as set forth in claim 1, in which the means for supplying dry gas include a fan communicating with the atmosphere and with the insulating space, and means in said line of communication for dehydrating the gas.

3. The method of avoiding condensation in a double walled refrigerator, each wall of which is substantially but imperfectly hermetically sealed, which comprises supplying dry gas to the space between the walls under a slight superatmospheric pressure, said gas leaving said space through said imperfections.

4. The method of avoiding condensation in a double walled refrigerator, each wall of which is substantially but imperfectly hermetically sealed, which comprises supplying air to said space having water vapor present therein to an amount not substantially greater than 0.006 mm. of mercury pressure, said gas leaving said space through said imperfections.

5. In a refrigerating device, a substantially but imperfectly hermetically sealed wall defining a refrigerating chamber, means for cooling the chamber to a refrigerating temperature, a second wall spaced outside of the first wall defining an insulating space between the walls, a porous insulating material in the insulating space, said second wall also being substantially but imperfectly hermetically sealed, and fan means for supplying dry gas under slight superatmospheric pressure to said insulating space, said gas leaving said insulating space through said imperfections.

ARNOLD H. HEINEMAN.

REFERENCES CITED

The following references are of record in the file of this patent:

UNITED STATES PATENTS

| Number | Name | Date |
|---|---|---|
| 233,492 | Field | Oct. 19, 1880 |
| 275,387 | Hunter | Apr. 10, 1883 |
| 1,647,785 | Coughlin | Nov. 1, 1927 |
| 1,856,008 | Warren | Apr. 26, 1932 |
| 2,151,713 | Niemann | Mar. 28, 1939 |
| 2,160,831 | Colby | June 6, 1939 |